(No Model.)
C. W. SCHRAMM.
MEASURING DEVICE.
No. 529,202.  Patented Nov. 13, 1894.
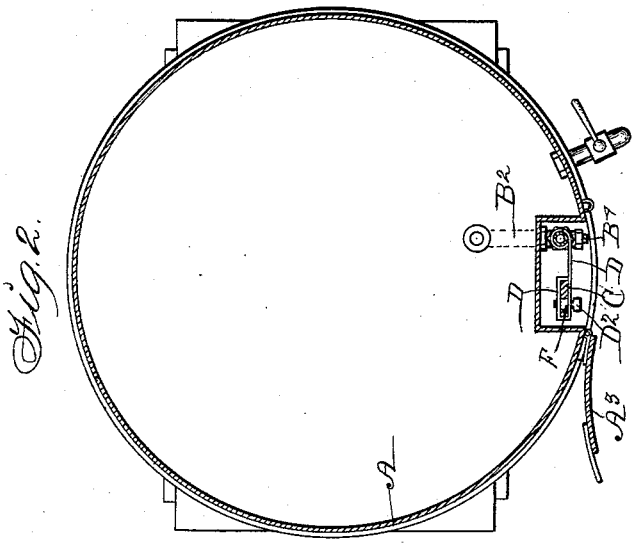
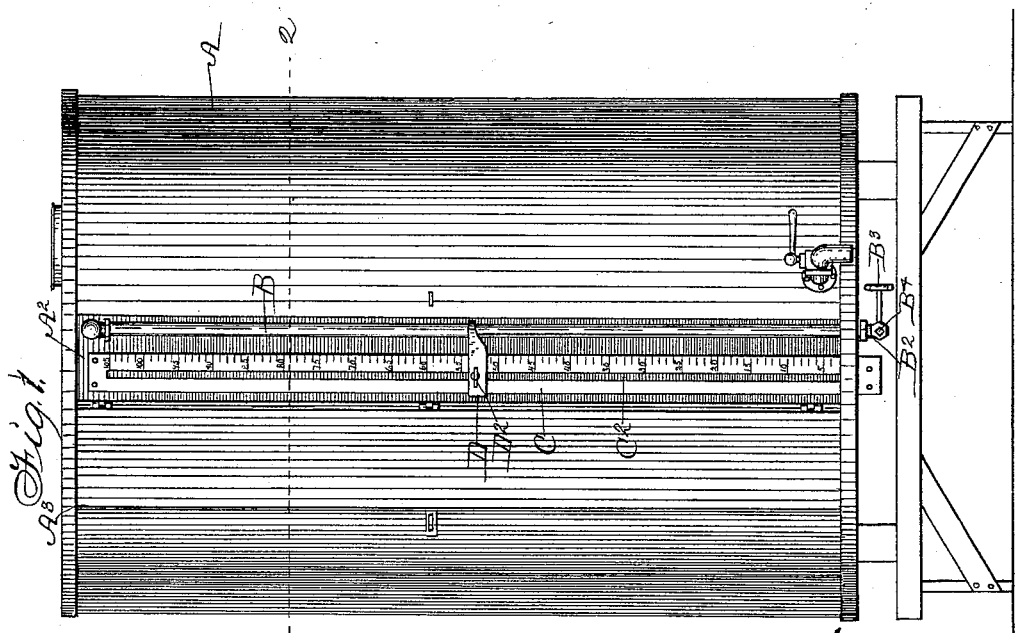
Witnesses:
R. H. Orwig
C. F. Wilson
Inventor: Charles W. Schramm,
By Thomas C. and J. Ralph Orwig
Attorneys

UNITED STATES PATENT OFFICE.

CHARLES W. SCHRAMM, OF DES MOINES, IOWA.

MEASURING DEVICE.

SPECIFICATION forming part of Letters Patent No. 529,202, dated November 13, 1894.

Application filed January 8, 1894. Serial No. 496,212. (No model.)

*To all whom it may concern:*

Be it known that I, CHARLES W. SCHRAMM, a citizen of the United States, residing at Des Moines, in the county of Polk and State of Iowa, have invented an Improved Automatic Measuring Device for Oil-Cans, &c., of which the following is a specification.

The objects of my invention are, first, to provide an oil can having a glass tube or gage communicating with its interior and so arranged that the can may be rolled on its side without breaking said glass tube or gage, and my object is further to provide a graduated scale in a parallel position with the tube and an adjustable indicator thereon which may be placed at any desirable number and the fluid be drawn off or placed in said tank until the fluid in the tube reaches said indicator to promote accuracy and prevent mistakes in handling fluids without measuring the same.

With these objects in view my invention consists first in the construction, arrangement and combination of the tube with the tank, whereby the tube is protected by the tank, and further in the arrangement and combination with the tube of the graduated scale and adjustable indicator as hereinafter set forth, pointed out in my claims and illustrated in the accompanying drawings, in which—

Figure 1 is a front elevation of the complete device. Fig. 2 is a horizontal sectional view through the line 2—2 of Fig. 1.

Referring to the accompanying drawings the reference letter A is used to designate the tank, preferably made of sheet metal and having formed in its front face a recess $A^2$ extending vertically throughout the entire height of the tank and formed therein by bending the sheet metal before the tank is completed.

$A^3$ designates a cover hinged to the tank at the side of the recess and adapted to cover said recess to protect the tubes therein.

B designates a glass tube communicating with the interior of the tank by means of a pipe $B^2$ and secured in the said recess.

$B^3$ is a cut off valve on the pipe $B^2$ and $B^4$ a plug also in said pipe which may be removed when it is desirable to cleanse the tube.

C designates an upright fixed in said recess and extended parallel with the said tube and provided with a graduated scale marked on its front face.

$C^2$ is a slot extended vertically through its central portion for purposes hereinafter explained.

D designates the indicator formed of a single piece of metal bent around the said upright and partially around the tube. This indicator is made vertically adjustable upon said upright by means of a set screw $D^2$ passed through a bore in the front portion of the indicator and having its screw threaded inner end inserted in a screw-threaded bore in the opposite side of the indicator so that when said screw is operated the opposite sides of the indicator may be brought together or separated to clamp the upright between said sides.

F designates a block placed in the slot $C^2$ and having the set screw $D^2$ passed therethrough for the purpose of guiding the indicator.

In practical operation, when it is desired to put a certain predetermined amount of fluid in the tank, the indicator is first placed at the desired point on the graduated scale. Then when the fluid in the tube reaches the said indicator the flow may be stopped or the indicator may be set at the line of the oil in the tank, and when filled further the difference be completed. In drawing off the fluid, assuming that the tank contains fifty gallons and it is desired to draw off five gallons the indicator would be set at the 45 mark and the faucet be left open until the fluid in the tube reaches the indicator.

I am aware that heretofore graduated scales have been marked on the glass tubes or gages of tanks and also on plates at the side of a tube but in no instance has an adjustable indicator been combined with a scale and tube so that the indicator may first be set at the desired position and then the fluid drawn off until it reaches the indicator so that an operator may readily see when the desired amount is withdrawn and mistakes be avoided.

Having thus described my invention, what I claim as new therein, and desire to secure by Letters Patent of the United States therefor, is—

1. The combination with a suitable tank having a vertical recess in its front, of an upright having a slot in its central portion, in said recess and having a graduated scale thereon, a glass tube also in said recess in proximity to the upright, an indicator passed around said upright and partially around the tube, and a set screw extended through the indicator and the slot in the said upright, substantially as and for the purposes stated.

2. The combination with a suitable tank, having means for admitting and discharging fluids, of a glass tube communicating therewith and an upright having a graduated scale thereon and a vertical slot as set forth, placed in a position parallel with said tube, and the indicator passed around said upright and partially around the tube, a block slidingly mounted in said slot and a set screw passed through said indicator and block substantially as, and for the purposes, stated.

CHARLES W. SCHRAMM.

Witnesses:
J. R. ORWIG, Sr.,
J. RALPH ORWIG.